US 9,600,470 B2

(12) United States Patent
Khan (10) Patent No.: US 9,600,470 B2
(45) Date of Patent: Mar. 21, 2017

(54) METHOD AND SYSTEM RELATING TO RE-LABELLING MULTI-DOCUMENT CLUSTERS

(71) Applicant: Whyz Technologies Limited, Ottawa (CA)

(72) Inventor: Shahzad Khan, Ottawa (CA)

(73) Assignee: Whyz Technologies Limited, Ottawa, Ontario (CA)

( * ) Notice: Subject to any disclaimer, the term of this patent is extended or adjusted under 35 U.S.C. 154(b) by 377 days.

(21) Appl. No.: 13/753,668

(22) Filed: Jan. 30, 2013

(65) Prior Publication Data

US 2013/0311462 A1 Nov. 21, 2013

Related U.S. Application Data

(60) Provisional application No. 61/647,183, filed on May 15, 2012.

(51) Int. Cl.
*G06F 7/00* (2006.01)
*G06F 17/27* (2006.01)
*G06F 17/30* (2006.01)
*G06F 17/28* (2006.01)

(52) U.S. Cl.
CPC .... *G06F 17/2785* (2013.01); *G06F 17/30684* (2013.01); *G06F 17/30699* (2013.01); *G06F 17/30707* (2013.01); *G06F 17/274* (2013.01); *G06F 17/289* (2013.01)

(58) Field of Classification Search
CPC ......... G06F 17/30867; G06F 17/30994; G06F 2216/03

USPC .......................................................... 707/737
See application file for complete search history.

(56) References Cited

U.S. PATENT DOCUMENTS

| 6,353,824 | B1* | 3/2002 | Boguraev | G06F 17/214 704/9 |
| 6,553,373 | B2* | 4/2003 | Boguraev | G06F 17/214 |
| 7,092,936 | B1* | 8/2006 | Alonso et al. | 707/737 |
| 7,743,059 | B2* | 6/2010 | Chan | G06F 17/30867 705/26.7 |
| 7,966,225 | B2* | 6/2011 | Chan | G06F 17/30522 705/26.7 |
| 7,971,150 | B2* | 6/2011 | Raskutti | G06F 17/3071 707/736 |
| 2002/0133480 | A1* | 9/2002 | Boguraev | G06F 17/214 |
| 2004/0083206 | A1* | 4/2004 | Wu et al. | 707/3 |

(Continued)

*Primary Examiner* — Cheyne D Ly
(74) *Attorney, Agent, or Firm* — Rosenberg, Klein & Lee (57) ABSTRACT

Individuals receive overwhelming barrage of information which must be filtered, processed, analyzed, reviewed, consolidated and distributed or acted upon. However, prior art tools for automatically processing content, such as for example returning search results from an Internet or database search for example are ineffective. Prior art search techniques merely provide large numbers of "hits" with at most removal of multiple occurrences of identical items. However, it would be beneficial to present searches as a series of multi-document clusters wherein occurrences of commonly themed content are clustered allowing the user to rapidly see the number of different themes and review a selected theme. Further, it would be beneficial, in repeated searches, for new clusters to be identified automatically as well as new items of content associated with existing clusters to be associated to these clusters.

12 Claims, 5 Drawing Sheets

(56) References Cited

U.S. PATENT DOCUMENTS

2008/0120292 A1* 5/2008 Sundaresan et al. ............. 707/5
2013/0304749 A1* 11/2013 Cooper ............. G06F 17/30867
　　　　　　　　　　　　　　　　　　　　　707/748

* cited by examiner

_METHOD AND SYSTEM RELATING TO RE-LABELLING MULTI-DOCUMENT CLUSTERS_

CROSS-REFERENCE TO RELATED APPLICATIONS

This patent application claims the benefit of U.S. Provisional Patent Application 61/647,183 filed May 15, 2012 entitled "Method and System of Managing Content" the entire contents of which are incorporated by reference.

FIELD OF THE INVENTION

The present invention relates to published content and more specifically to the processing of published content to associate and label the content to multi-document clusters.

BACKGROUND OF THE INVENTION

In 2008, Americans consumed information for approximately 1.3 trillion hours, or an average of almost 12 hours per day per person (Global Information Industry Center, University of California at San Diego, January 2010). Consumption totaled 3.6 zettabytes ($3.6 \times 10^{21}$ bytes) and 10,845 trillion ($10,845 \times 10^{12}$) words, corresponding to 100,500 words and 34 gigabytes for an average person on an average day. This information coming from over twenty different sources of information, from newspapers and books through to online media, social media, satellite radio, and Internet video although the traditional media of radio and TV still dominated consumption per day.

Computers and the Internet have had major effects on some aspects of information consumption. In the past, information consumption was overwhelmingly passive, with telephone being the only interactive medium. However, with computers, a full third of words and more than half of digital data are now received interactively. Reading, which was in decline due to the growth of television, tripled from 1980 to 2008, because it is the overwhelmingly preferred way to receive words on the Internet. At the same time portable electronic devices and the Internet have resulted in a large portion of the population in the United States for example becoming active generators of information throughout their daily lives as well as active consumers augmenting their passive consumption. Social media such as Facebook™ and Twitter™, blogs, website comment sections, Bing™ Yahoo™ have all contributed in different ways to the active generation of information by individuals which augments that generated by enterprises, news organizations, Government, and marketing organizations.

Globally the roughly 27 million computer servers active in 2008 processed 9.57 zettabytes of information (Global Information Industry Center, University of California at San Diego, April 2011). This study also estimated that enterprise server workloads are doubling about every two years and whilst a substantial portion of this information is incredibly transient overall the amount of information created, used, and retained is growing steadily.

The exploding growth in stored collections of numbers, images and other data represents one facet of information management for organizations, enterprises, Governments and individuals. However, even what was once considered "mere data" becomes more important when it is actively processed by servers as representing meaningful information delivered for an ever-increasing number of uses. Overall the 27 million computer servers were estimated as providing an average of 3 terabytes of information per year to each of the estimated 3.18 billion workers in the world's labor force.

Increasingly, a corporation's competitiveness hinges on its ability to employ innovative search techniques that help users discover data and obtain useful results. In some instances automatically offering recommendations for subsequent searches or extracting related information are beneficial. To gain some insight into the magnitude of the problem consider the following:

in 2009 around 3.7 million new domains were registered each month and as of June 2011 this had increased to approximately 4.5 million per month;
approximately 45% of Internet users are under 25;
there are approximately 600 million wired and 1,200 million wireless broadband subscriptions globally;
approximately 85% of wireless handsets shipped globally in 2011 included a web browser;
there are approximately 2.1 billion Internet users globally with approximately 2.4 billion social networking accounts;
there are approximately 800 million users on Facebook™ and approximately 225 million Twitter™ accounts;
there are approximately 250 million tweets per day and approximately 250 million Facebook activities;
there are approximately 3 billion Google™ searches and 300 million Yahoo™ searches per day.

Accordingly it would be evident that users face an overwhelming barrage of information (content) that must be filtered, processed, analysed, reviewed, consolidated and distributed or acted upon. For example a market researcher seeking to determine the perception of a particular product may wish to rapidly collate sentiments from reviews sourced from websites, press articles, and social media. However, existing sentiment filtering approaches simply determine occurrences of a keyword with positive and negative terms. Accordingly content containing the phrase "Last night I drove to see Terminator 3 in my new Fiat 500, after eating at Stonewall's, the truffle bison burger was great" would be interpreted as positive feedback even though the positive term is associated with the food rather than either the film "Terminator 3" or the vehicle "Fiat 500." Accordingly, it would be beneficial for sentiment analysis of content to be contextually aware.

Similarly, a search by a user using the terms "Barack Obama Afghanistan" with Google™ run on May 2, 2012 returns approximately 324 million "hits" in a fraction of a second. These are displayed, by default in the absence of other filters by the user, in an order determined by rules executed by Google™ servers relating to factors including, but not limited to, match to user entered keywords and the number of times a particular webpage or item of content has been opened. However, within this search the same content may be reproduced multiple times in different sources legitimately as well as having been plagiarized partially into other sources as well as the same event being presented through different content on other websites. Accordingly, different occurrences of Barack Obama visiting Afghanistan or different aspects of his visit to Afghanistan may become buried in an overwhelming reporting of his last visit or the repeated occurrence of strategic photo opportunities during the visit during a campaign.

Accordingly, it would be beneficial for the user to be able to retrieve a collection of multiple items of content, commonly referred to as documents, which mention one or more concepts or interests, and automatically cluster them into cohesive groups that relate to the same concepts or interests. Each cohesive group (or cluster) formed thereby consists of one or more documents from the original collection which describe the same concept or interest even where the documents have perhaps a different vocabulary. Even when a user identifies an item of content of interest, for example a review of a product, then the salient text may be buried within a large amount of other content or alternatively the item of content may be formatted for display upon laptops, tablet PCs, etc. whereas the user is accessing the content on a portable electronic device such as a smartphone or portable gaming console for example.

Accordingly it would be beneficial for the user to be able to access the salient text contained in one or more items of content, based on learned semantic and content structure cues so that extraneous elements of the item of content are removed. Accordingly it would be beneficial to provide a tool for inducing content scraping automatically to filter content to that necessary or automatically extracting core text for viewing on constrained screen devices or vocalizing through a screen reader. Automated summarization or text simplification may also form extensions of the scraper.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to provide improvements in the art relating to published content and more specifically to the processing of published content for users to associate sentiment to content, cluster content for review, and extract core text.

In accordance with an embodiment of the invention there is provided a method comprising:
a) receiving a plurality of items of content;
b) extracting with a microprocessor for each item of content of the plurality of items of content at least one theme of a plurality of themes;
c) determining an association matrix with the microprocessor for the plurality of themes extracted from the plurality of items of content;
d) calculating a co-occurrence density with the microprocessor for each theme—theme co-occurrence and sorting the resulting co-occurrence densities;
e) selecting the theme—theme tuple with the highest co-occurrence frequency and establishing a set of seed terms for the selected theme—theme tuple;
f) determining with the microprocessor correlations of the set of seed terms with the other themes of the plurality of themes to establish a saliency for each theme of the plurality of themes; and
g) removing with the microprocessor those items of content of the plurality of items of content having a saliency below a predetermined threshold to create a cohesive cluster of items of content.

In accordance with an embodiment of the invention there is provided a method comprising:
receiving a plurality of items of content from a search;
creating at least a cluster of a plurality of clusters from the plurality of items, each cluster comprising those items of the plurality of items having co-occurrences of a predetermined sub-set of themes of a plurality of themes meeting a predetermined theme threshold;
establishing a header item, the header item being one of the items of the plurality of items having co-occurrences of a predetermined sub-set of themes of a plurality of themes meeting a predetermined threshold; and
presenting the search results by only the header item.

In accordance with an embodiment of the invention there is provided a method comprising:
a) establishing a criteria relating to a topic of interest to a user;
b) retrieving from at least a first content source of a plurality of first content sources a predetermined number of first headlines relating to items of content, each title meeting the criteria;
c) retrieving from at least a second content source of a plurality of second content sources a plurality of second headlines relating to items of content;
d) comparing each of the second headline of the plurality of second headlines against the predetermined number of first headlines to establish a similarity score for that second headline of the plurality of second headlines;
e) determining for each second headline of the plurality of second headlines an action, the action determined in dependence upon at least whether the similarity score exceeds a predetermined threshold; and
f) performing the determined action, the determined action at least one of:
marking the second headline of the plurality of second headlines as pre-existing when the similarity score exceeds the predetermined threshold; and
marking the second headline of the plurality of second headlines as new when the similarity score does not exceed the predetermined threshold.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to published content and more specifically to the processing of published content for users to associate sentiment to content, cluster content for review, and extract core text.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for electronic communications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader. A "fixed electronic device" (FED) as used herein and throughout this disclosure, refers to a wired or wireless device used for electronic communications that may be dependent upon a fixed source of power, employ a battery or other independent form of energy for power. This includes devices, but is not limited to, such as a portable computer, personal computer, Internet enabled display, gaming console, computer server, kiosk, and a terminal.

A "network operator/service provider" as used herein may refer to, but is not limited to, a telephone or other company that provides services for mobile phone subscribers including voice, text, and Internet; telephone or other company that provides services for subscribers including but not limited to voice, text, Voice-over-IP, and Internet; a telephone, cable or other company that provides wireless access to local area, metropolitan area, and long-haul networks for data, text, Internet, and other traffic or communication sessions; etc.

"Content", "input content" and/or "document" as used herein and through this disclosure refers to an item or items of information stored electronically and accessible to a user for retrieval or viewing. This includes, but is not limited to, documents, images, spreadsheets, databases, audiovisual data, multimedia data, encrypted data, SMS messages, social media data, data formatted according to a markup language, and information formatted according to a portable document format.

A "web browser" as used herein and through this disclosure refers to a software application for retrieving, presenting, and traversing information resources on the World Wide Web identified by a Uniform Resource Identifier (URI) and may be a web page, image, video, or other piece of content. The web browser also allows a user to access and implement hyperlinks present in accessed resources to navigate their browsers to related resources. A web browser may also be defined within the scope of this specification as an application software or program designed to enable users to access, retrieve and view documents and other resources on the Internet as well as access information provided by web servers in private networks or files in file systems.

An "application" as used herein and through this disclosure refers to a software application, also known as an "app", which is computer software designed to help the user to perform specific tasks. This includes, but is not limited to, web browser, enterprise software, accounting software, information work software, content access software, education software, media development software, office suites, presentation software, work processing software, spreadsheets, graphics software, email and blog client software, personal information systems and desktop publishing software. Many application programs deal principally with multimedia, documentation, and/or audiovisual content in conjunction with a markup language for annotating a document in a way that is syntactically distinguishable from the content. Applications may be bundled with the computer and its system software, or may be published separately.

A "user," as used herein and through this disclosure refers to, but is not limited to, a person or device that generates, receives, analyses, or otherwise accesses content stored electronically within a portable electronic device, fixed electronic device, network accessible server, or other source storing content.

A "server" as used herein and through this disclosure refers to a computer program running to serve the requests of other programs, the "clients". Thus, the "server" performs some computational task on behalf of "clients" which may either run on the same computer or connect through a network. Accordingly such "clients" therefore being applications in execution by one or more users on their PED/FED or remotely at a server. Such a server may be one or more physical computers dedicated to running one or more services as a host. Examples of a server include, but are not limited to, database server, file server, mail server, print server, and web server.

Figure 1A:
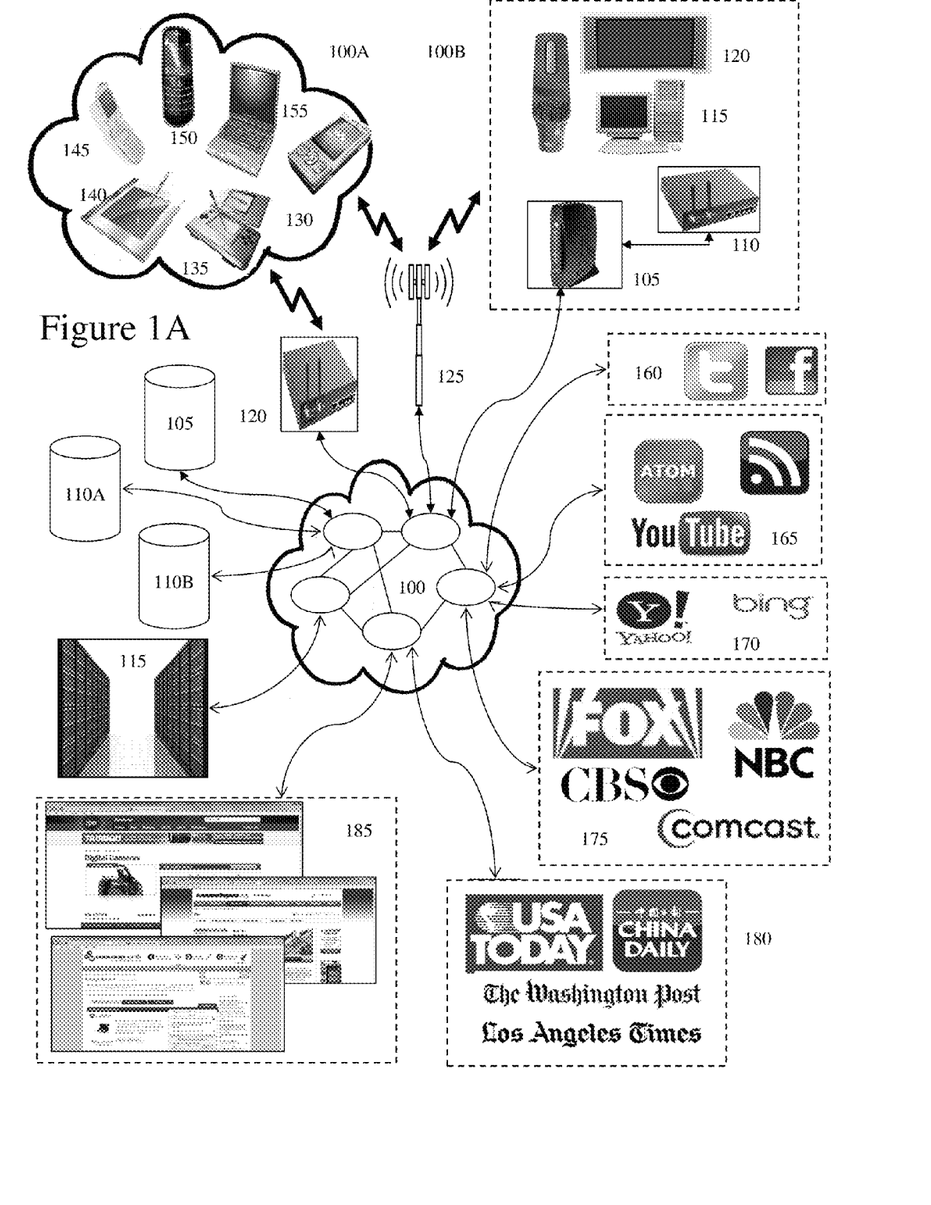
FIG. 1A depicts a network accessible by a user and content sources accessible to the user with respect to embodiments of the invention.

Referring to FIG. 1A there is depicted a network supporting communications and interactions between devices connected to the network and executing functionalities according to embodiments of the invention with a first and second user groups 100A and 1000B respectively to a telecommunications network 100. Within the representative telecommunication architecture a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The remote central exchange 180 is connected via the network 100 to local, regional, and international exchanges (not shown for clarity) and therein through network 100 to first and second wireless access points (AP) 120 and 110 respectively which provide Wi-Fi cells for first and second user groups 100A and 100B respectively.

Within the cell associated with first AP 120 the first group of users 100A may employ a variety of portable electronic devices (PEDs) including for example, laptop computer 155, portable gaming console 135, tablet computer 140, smartphone 150, cellular telephone 145 as well as portable multimedia player 130. Within the cell associated with second AP 110 the second group of users 100B may employ a variety of portable electronic devices (not shown for clarity) but may also employ a variety of fixed electronic devices (FEDs) including for example gaming console 125, personal computer 115 and wireless/Internet enabled television 120 as well as cable modem 105 which links second AP 110 to the network 100.

Also connected to the network 100 is cell tower 125 that provides, for example, cellular GSM (Global System for Mobile Communications) telephony services as well as 3G and 4G evolved services with enhanced data transport support. Cell tower 125 provides coverage in the exemplary embodiment to first and second user groups 100A and 100B. Alternatively the first and second user groups 100A and 100B may be geographically disparate and access the network 100 through multiple cell towers, not shown for clarity, distributed geographically by the network operator or operators. Accordingly, the first and second user groups 100A and 100B may according to their particular communications interfaces communicate to the network 100 through one or more communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000. It would be evident to one skilled in the art that many portable and fixed electronic devices may support multiple wireless protocols simultaneously, such that for example a user may employ GSM services such as telephony and SMS and Wi-Fi/WiMAX data transmission, VOW and Internet access.

Also communicated to the network 100 are first and second servers 110A and 110B respectively which host according to embodiments of the invention multiple services associated with content from one or more sources including for example, but not limited to:

social media 160 such as Facebook™, Twitter™, LinkedIn™ etc;

web feeds 165 such as formatted according to RSS and/or Atom formats to publish frequently updated works;

web portals 170 such as Yahoo™, Google™, Baidu™, and Microsoft's Bing™ for example;

broadcasters 175 including Fox, NBC, CBS, and Comcast for example who provide content via multiple media including for example satellite, cable, and Internet;

print media 180 including for example USA Today, Washington Post, Los Angeles Times and China Daily;

websites 185 including, but not limited to, manufacturers, market research, consumer research, newspapers, journals, and financial institutions.

Also connected to network 100 is application server 105 which provides software system(s) and software application(s) associated with receiving retrieved content and processing said published content for users to associate sentiment to content, cluster content for review, and extract core text as discussed below in respect of embodiments of the invention. First and second servers 110A and 110B and application server 105 together with other servers not shown for clarity may also provided dictionaries, speech recognition software, product databases, inventory management databases, retail pricing databases, shipping databases, customer databases, software applications for download to fixed and portable electronic devices, as well as Internet services such as a search engine, financial services, third party applications, directories, mail, mapping, social media, news, user groups, and other Internet based services.

Figure 1B:
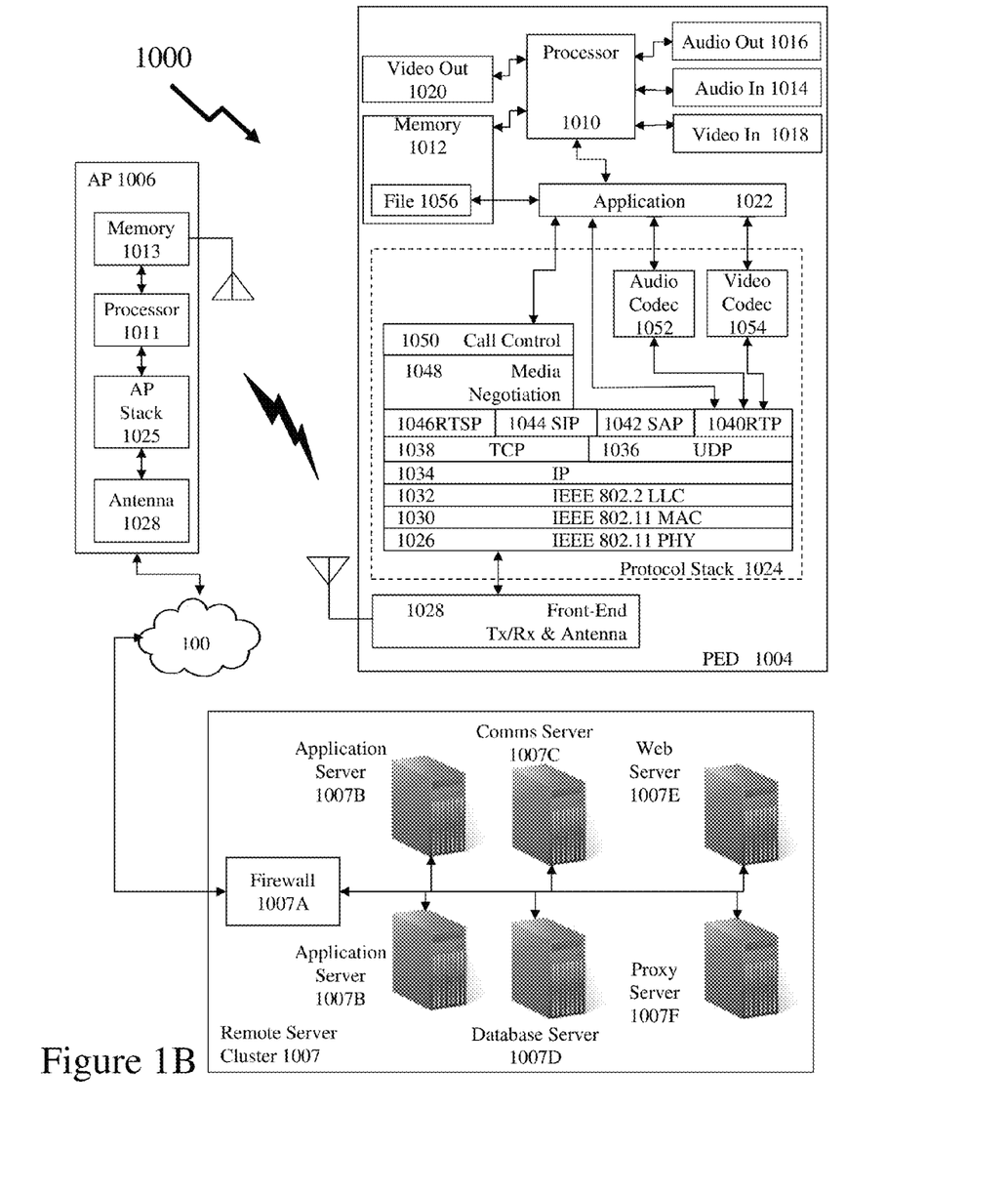
FIG. 1B depicts an electronic device supporting communications and interactions for a user according to embodiments of the invention

Referring to FIG. 1B there is depicted an electronic device 1004, supporting communications and interactions according to embodiments of the invention with local and/or remote services. Electronic device 1004 may be for example a PED, FED, a terminal, or a kiosk. Also depicted within the electronic device 1004 is the protocol architecture as part of a simplified functional diagram of a system 1000 that includes an electronic device 1004, such as a smartphone 155, an access point (AP) 1006, such as first Wi-Fi AP 110, and one or more remote servers 1007, such as communication servers, streaming media servers, and routers for example such as first and second servers 110A and 110B respectively. Remote server cluster 1007 may be coupled to AP 1006 via any combination of networks, wired, wireless and/or optical communication links such as discussed above in respect of FIG. 1. The electronic device 1004 includes one or more processors 1010 and a memory 1012 coupled to processor(s) 1010. AP 1006 also includes one or more processors 1011 and a memory 1013 coupled to processor(s) 1011. A non-exhaustive list of examples for any of processors 1010 and 1011 includes a central processing unit (CPU), a digital signal processor (DSP), a reduced instruction set computer (RISC), a complex instruction set computer (CISC) and the like. Furthermore, any of processors 1010 and 1011 may be part of application specific integrated circuits (ASICs) or may be a part of application specific standard products (ASSPs). A non-exhaustive list of examples for memories 1012 and 1013 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 1004 may include an audio input element 1014, for example a microphone, and an audio output element 1016, for example, a speaker, coupled to any of processors 1010. Electronic device 1004 may include a video input element 1018, for example, a video camera, and a video output element 1020, for example an LCD display, coupled to any of processors 1010. Electronic device 1004 includes one or more applications 1022 that are typically stored in memory 1012 and are executable by any combination of processors 1010. Electronic device 1004 includes a protocol stack 1024 and AP 1006 includes a communication stack 1025. Within system 1000 protocol stack 1024 is shown as IEEE 802.11 protocol stack but alternatively may exploit other protocol stacks such as an Internet Engineering Task Force (IETF) multimedia protocol stack for example. Likewise AP stack 1025 exploits a protocol stack but is not expanded for clarity. Elements of protocol stack 1024 and AP stack 1025 may be implemented in any combination of software, firmware and/or hardware. Protocol stack 1024 includes an IEEE 802.11-compatible PHY module 1026 that is coupled to one or more Front-End Tx/Rx & Antenna 1028, an IEEE 802.11-compatible MAC module 1030 coupled to an IEEE 802.2-compatible LLC module 1032. Protocol stack 1024 includes a network layer IP module 1034, a transport layer User Datagram Protocol (UDP) module 1036 and a transport layer Transmission Control Protocol (TCP) module 1038.

Protocol stack 1024 also includes a session layer Real Time Transport Protocol (RTP) module 1040, a Session Announcement Protocol (SAP) module 1042, a Session Initiation Protocol (SIP) module 1044 and a Real Time Streaming Protocol (RTSP) module 1046. Protocol stack 1024 includes a presentation layer media negotiation module 1048, a call control module 1050, one or more audio codecs 1052 and one or more video codecs 1054. Applications 1022 may be able to create maintain and/or terminate communication sessions with any of remote servers 1007 by way of AP 1006. Typically, applications 1022 may activate any of the SAP, SIP, RTSP, media negotiation and call control modules for that purpose. Typically, information may propagate from the SAP, SIP, RTSP, media negotiation and call control modules to PHY module 1026 through TCP module 1038, IP module 1034, LLC module 1032 and MAC module 1030.

It would be apparent to one skilled in the art that elements of the PED 1004 may also be implemented within the AP 1006 including but not limited to one or more elements of the protocol stack 1024, including for example an IEEE 802.11-compatible PHY module, an IEEE 802.11-compatible MAC module, and an IEEE 802.2-compatible LLC module 1032. The AP 1006 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module.

As depicted remote server cluster 1007 comprises a firewall 1007A through which the discrete servers within the remote server cluster 1007 are accessed. Alternatively remote server 1007 may be implemented as multiple discrete independent servers each supporting a predetermined portion of the functionality of remote server cluster 1007. As presented the discrete servers include application servers 1007B dedicated to running certain software applications, communications server 1007C providing a platform for communications networks, database server 1007D providing database services to other computer programs or computers, web server 1007E providing HTTP clients connectivity in order to send commands and receive responses along with content, and proxy server 1007F that acts as an intermediary for requests from clients seeking resources from other servers.

Labelled Multi-Document Clusters

Automatic Multi-Document Labeling Process:

Within this section of the specification processes for automatically creating labelled multi-document clusters from a collection of content are presented. The goal of these processes being to take a collection of content, e.g. multiple documents, that mention one or more concepts of interests, and automatically cluster them into cohesive groups that discuss the same event, news, or item (herein referred to as a concept). Each cohesive group (or cluster) thereby consisting of one or more documents from the original collection, relating to the same concept, wherein differences in vocabulary are accommodated in the process. Each cluster is also automatically assigned a descriptive label that identifies the core concept that each of the documents within the cluster describe.

Accordingly, embodiments of the invention allow multiple documents to be automatically distilled into a smaller set of "headlines" that can make it easier for a user to get an overview of the original document collection. Alternatively, embodiments of the invention allow for the creation of longitudinal "headlines" case-files for concepts that are present within the source content, e.g. media, over different periods of time. These case-files enable a software system and/or software application according to an embodiment of the invention to provide alerts when new or novel issues are discussed in the source media, as they do not map to any existing case-files, to maintain case-files over time allowing evolution and chronology to be easily established, to "contain" trend-analysis of key topics by effectively managing potentially high volumes of content on a particular topic, and automatically generate headline "timelines" which discuss dominant events associated with a tracked concept over predetermined timescales which may be minutes or hours for critical events or time sensitive events, weeks, months or years.

Figure 2A:
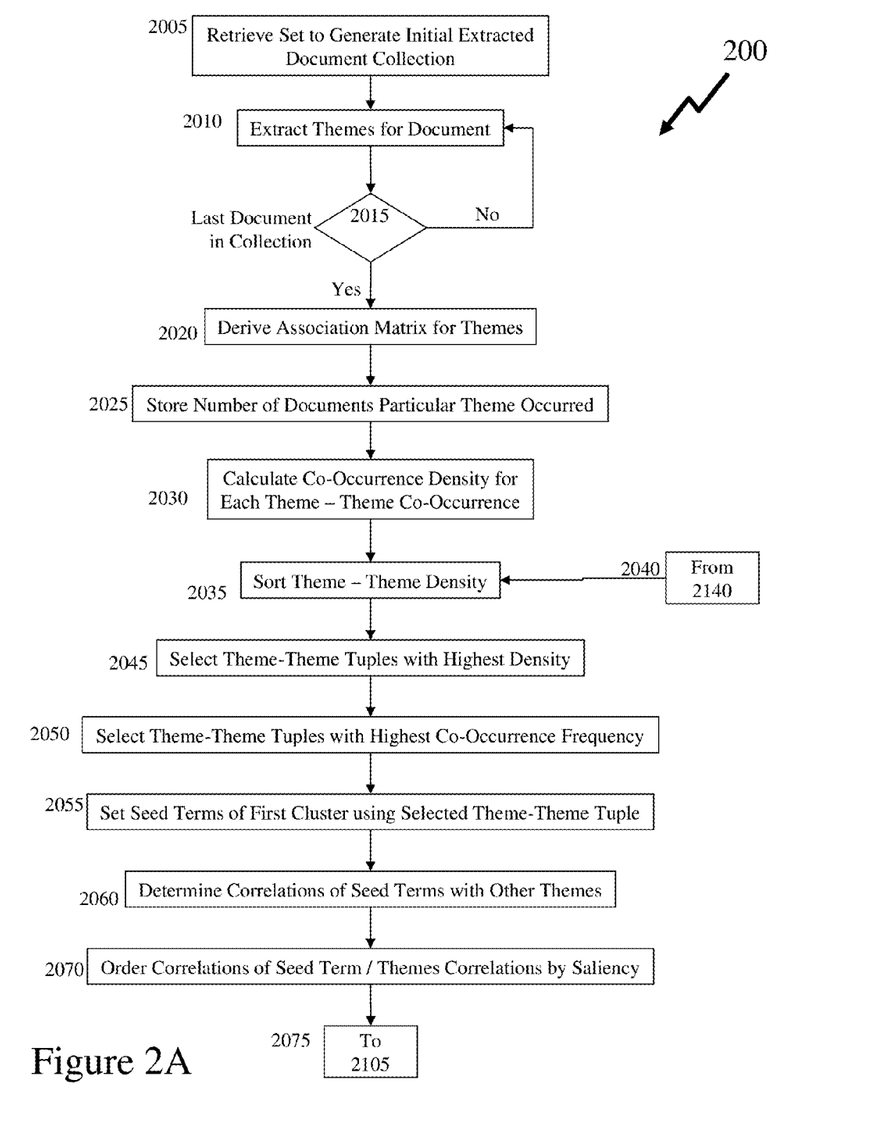
FIGS. 2A and 2B depict a process flow for creating labelled multi-document clusters from a collection of documents according to an embodiment of the invention.
Figure 2B:
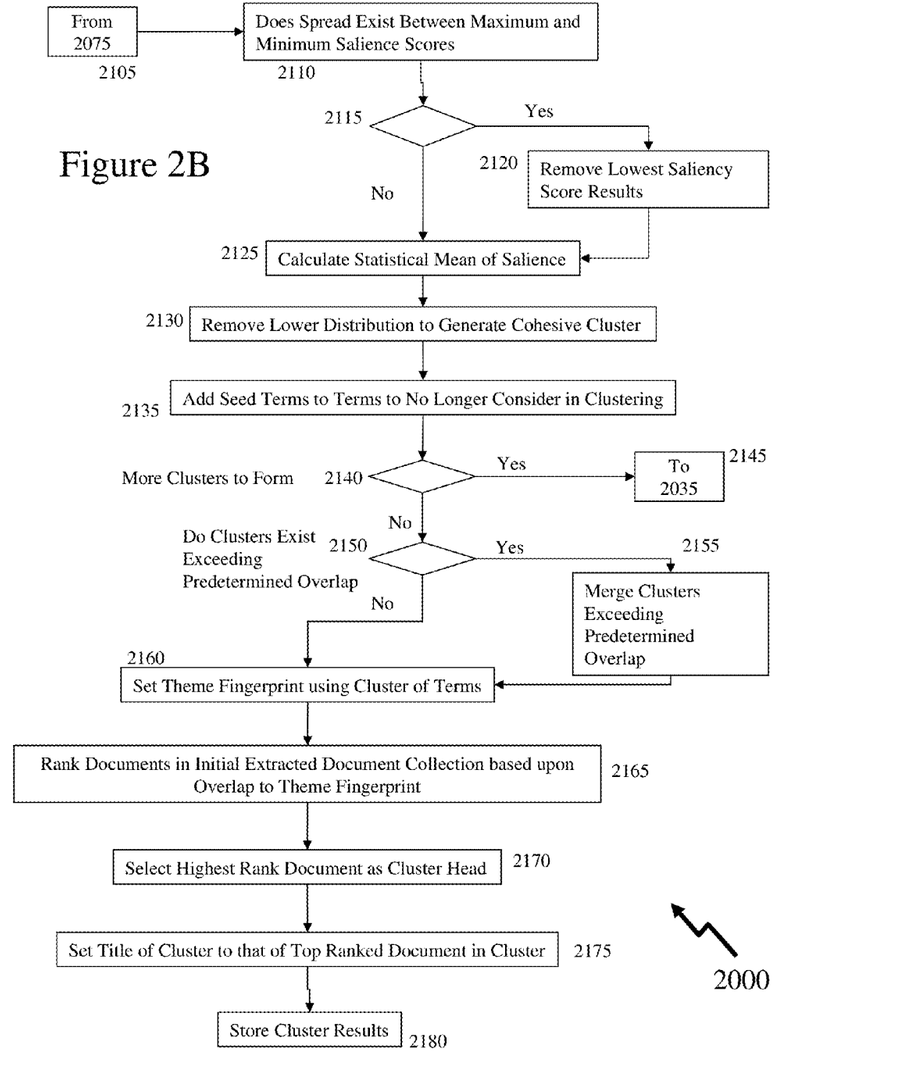

Referring to FIGS. 2A and 2B first and second process flow sections 200 and 2000 are depicted providing an overall process flow according to an embodiment of the invention for automatically creating labelled multi-document clusters from a collection of content. Accordingly first process flow section 200 in FIG. 2B begins with the retrieval of a set of documents in step 2005 associated with a set of topics. The set of documents may be retrieved from a document repository within a software system and/or software application according to an embodiment of the invention whereas in another embodiment of the invention the set of documents may be retrieved in real time from one or more sources. This set of documents being referred to as the initial extracted document collection.

Now in step 2010 for each document a core set of topics, named-entities or themes discussed in the document are extracted, referred to as themes. For each document typically between 8 and 25 themes are associated with it. Next in step 2015 the process determines if all documents in the initial extracted document collection have been processed for theme extraction wherein the process either loops back to step 2010 where the last document has not been processed or proceeds to step 2020. In step 2020 an association matrix is derived from the extracted themes wherein this association matrix counts the co-occurrences between each theme and the other themes that occur in the same document. For example, if the theme "Taliban" co-occurred with the theme "Afghanistan" 15 times, the association matrix would record this number. Also stored within the association matrix is the number of documents in which a particular theme occurred in step 2025. Thus, if the theme "Afghanistan" occurred in 20 documents, this number is stored in association with the theme "Afghanistan" within the association matrix.

Next in step 2030 the process calculates for each <theme→theme co-occurrence>a co-occurrence density which is calculated as the co-occurrence count divided by the total number of lines in which the theme occurred. Thus in the above example, the density of the <"Taliban"→"Afghanistan">co-occurrence is calculated as 15/20=0.75. In step 2035 the <theme→theme co-occurrence>co-occurrence densities are sorted by density, highest density first. The set N≥1 of <theme→theme>tuples with the highest density is selected in step 2045 and then in step 2050 from the selected <theme→theme>tuples the <theme→theme> with the highest co-occurrence frequency is selected. From this the seed terms for the first cluster are established in step 2055.

Next in step 2060 the seed terms are correlated to the other themes and then ordered according to saliency in step 2065. The saliency being defined as frequency of a term's co-occurrence with a theme multiplied by the density of the occurrences of the term. It would be evident to one skilled in the art that content may be correlated with multiple seed terms, or seed terms from multiple items of other content, and accordingly their correlations would count towards the saliency score. The process then in step 2075 proceeds to second flow section 2000 from which there is also a return loop to step 2035 as discussed below.

Accordingly referring to second flow section 2000 the process proceeds from first flow section 200 in step 2105 to step 2110 wherein it is determined whether a spread between the maximum salience terms score and the minimum salience terms score exist wherein if the determination in step 2115 is yes the process proceeds to step 2120 wherein the entries with the lowest scores are removed from the salience table before the process proceeds to step 2125. If the determination in step 2115 was no then the process proceeds directly to step 2125. Step 2120 frequently removes the hapax legomenon entries, which may in many instances only co-occur once with the selected seed terms.

Proceeding to step 2125 the process determines the statistical mean of the salience of the remaining terms and then proceeds in step 2130 to remove everything below this statistical mean thereby generating a cohesive cluster. The seed terms are then added to the set of terms to no longer consider for clustering in step 2135 before determining whether in step 2140 there are more clusters to form. If the determination is positive then the process proceeds to step 2145 wherein it returns to process step 235 in the first flow section 200 wherein the intervening process is repeated for the next highest density <theme→theme>tuple until a determination in step 2150 is that no <theme→theme>tuples remain and hence there are no more clusters to form.

Next in step 2150 a determination is made as to whether clusters exist wherein an overlap between the clusters exceeds a predetermined overlap. If such clusters exist the process proceeds to step 2155 wherein those clusters exceeding the predetermined overlap are merged before proceeding to step 2160 which is directly proceeded to from step 2150 is no clusters exceeding the predetermined overlap exist. In step 2160 each cluster of terms is set as a "theme" fingerprint and each of the documents in the initial extracted document collection is ranked in step 2165 according to similarity with this theme fingerprint. This ranking may be established for example via a standard Vector Space model, Jaccard index, or other similarity measure. In step 2170 the highest ranked documents are selected as being part of this cluster. The ranking can be either done on the core topics associated with the document, or against the full text. Next in step 2175 the title of the top ranked document is set as the label for this cluster and then in step 2180 the cluster results are stored. Optionally additional steps may be executed at this point.

Optionally, the title may be simplified as the label or an extracted summary may be employed. Alternatively a simple title for the highest ranked document and hence its associated cluster may be generated via a natural language parse of the document text.

It would be evident to one skilled in the art that a document as referred to within the above description with respect to first and second process flow sections 200 and 2000 is one specific form of content and that according to embodiments of the invention a single overall combined process flow may be executed for arbitrary content types or that it may be executed upon a predetermined sub-set of content types. Optionally, multiple combined process flows may be executed targeting different content type sub-groups, such as one for example capturing text based content and another audiovisual content. In such instances the themes of one process flow may be deemed to be a master theme set and employed in the analysis within other process flows for other content types.

Figure 3:
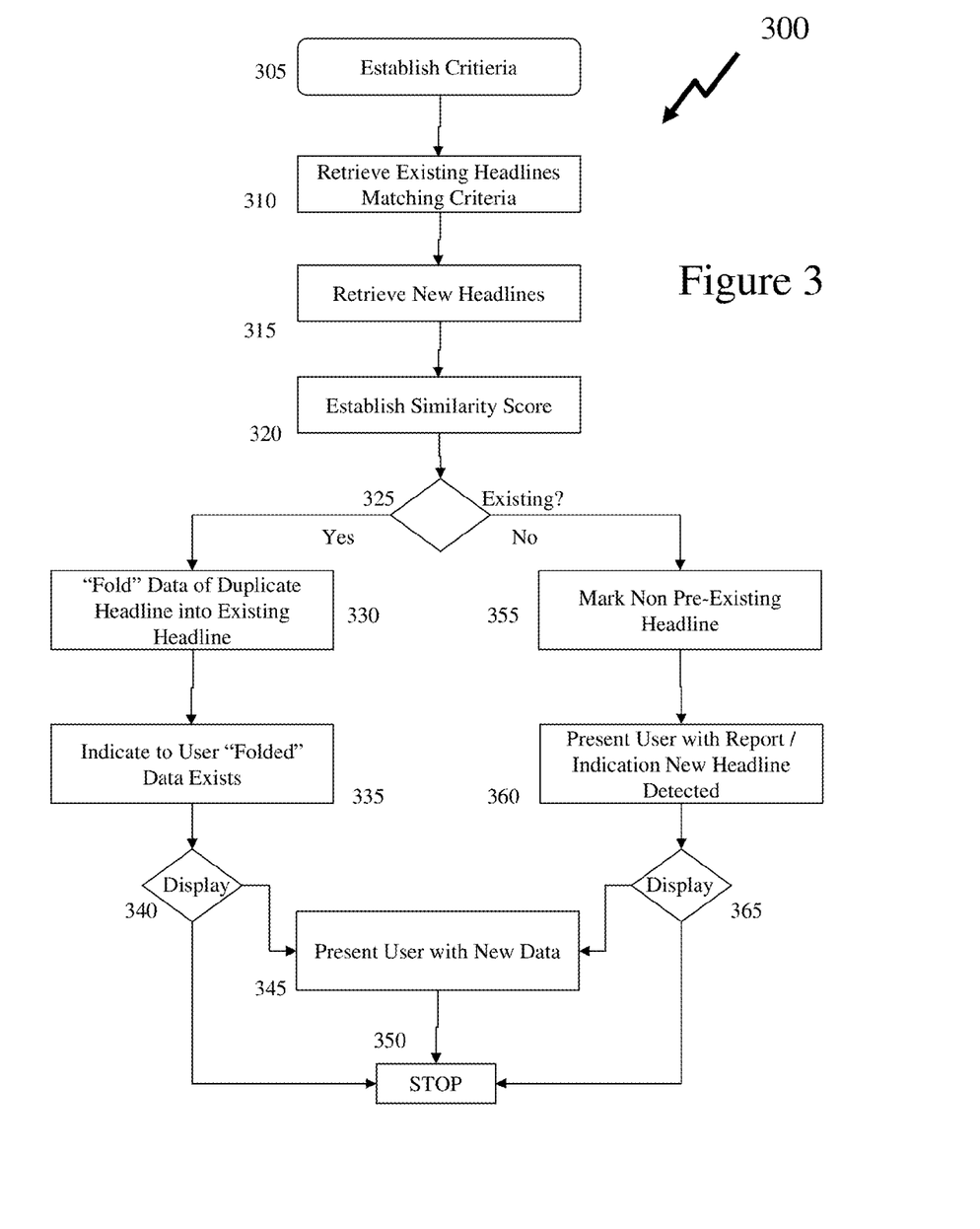
FIG. 3 depicts a process flow for establishing new key concepts within evolving multi-document clusters according to an embodiment of the invention.

New Headline Identification and Content Folding Process:

Now referring to FIG. 3 there is depicted a process flowchart 300 according to an embodiment of the invention for establishing new key concepts, headlines, etc within evolving multi-document clusters according to an embodiment of the invention. For example a user may identify new "headlines" via comparison with existing "headlines" via the process presented within flowchart 300. Accordingly, in step 305 a single criterion is or multiple criteria are established for selecting existing headlines from a dataset of existing headlines. Such a criterion may include for example, matching a keyword, matching multiple keywords individually, matching multiple keywords in combination, a date range, a data range, a source, and multiple sources. For example, headlines may be selected solely upon a series of keywords. However, where multiple criteria are employed rather than a single criterion different Boolean operations may be applied such as ⟨(Facebook)OR(LinkedIn)⟩ AND⟨(NewYorkTimes)or(CNN)⟩ NOT⟨(Lawsuit)⟩. Next in step 310 all existing headlines from a dataset of existing headlines are retrieved matching the criteria selected before in step 315 new headlines from a content source or content sources are retrieved and then in step 320 compared against the retrieved existing headlines to ascertain a similarity score.

In step 325 the similarity scores are thresholded to determine whether the headline to which the similarity score relates is new, i.e. the similarity score is below the threshold, or a duplicate, i.e. the score is above the threshold. If the headline is a duplicate then the process moves to step 330 wherein some or all of the data of the duplicate headline is folded into the pre-existing headline. "Folding" some or all of the data, a data clipping, of the duplicate headline into the pre-existing headline may mean adding the data clipping to a file associated with the headline or alternatively one or other techniques such as salient content extraction and sentiment analysis for example may be applied to the data to form the data clipping prior to its integration with the previously clipped and stored data. The process then proceeds to step 330 and indicates to the user that new folded data exists in respect of that particular headline wherein the user in step 340 may choose to display the new folded data for all or some of the headlines for which the new existence is indicated. If the user elects to view then then process proceeds to step 345 wherein the folded content is presented to the user and then the process moves to step 350 and stops.

If at step 325 the headline was established as being below the similarity score threshold then the new the process proceeds to step 355 wherein the headline is marked as new. Next in step 360 the user is presented with a report/indication of the new headline and given the option to display it or not wherein the process proceeds to either step 345 to display it or step 350 to stop. Within the embodiment of the invention presented supra in respect of FIG. 3 and process flowchart 300 has been described as a single process sequence wherein all headings are retrieved and compared before the results are presented to the user. However, it would be evident that alternatively the process may loop sequentially extracting a new headline and performing the comparison, folding, display etc according to the flow for each headline or that multiple processing threads may act in parallel on discrete headlines or subsets of the extracted set of headlines.

Alternatively, the folded headline may be forwarded to a subscriber of the software application and/or software system automatically, based upon their preferences within the software application and/or software system, so that they can track the evolution of a headline and/or receive only the salient content of each item of retrieved information for which the headline is processed. Within the description of process flowchart 300 in FIG. 3 the process is described as being performed upon "headlines." A headline may include, but not be limited to, the title of an item of electronic content, a tag associated with an item of electronic content, a heading field within an item of electronic content, and a heading associated with an item of electronic content generated in dependence of a process of core content extraction and/or salient content extraction. An item of electronic content may refer to, for example, an article, a blog, a social media post, an email, a comment posted to a website, a word processing document, an office document, a response to a survey, an item of multimedia content, and an item of audiovisual content. Accordingly, a user may extract a headline, e.g. topic, from one source set of electronic content, e.g. news headlines from a news feed service, and apply this to another source of electronic content, e.g. Twitter™, news agency website, and outgoing electronic mail for example.

Optionally, headlines of items of content established as being below the similarity score threshold but within a predetermined range of the similarity score threshold may be handled by an additional process flow, not depicted in FIG. 3, wherein these headlines are stored and an indication presented to the user that items of content with similarity scores close to the criteria established exist. If the user wishes these may be presented for association by the user to either the pre-existing or new categories. Optionally, according to an embodiment of the invention a user may establish a criteria which is then employed as a seed to a number of processes wherein each process takes the established criteria and adds a sentiment, e.g. positive, neutral, negative wherein matches for any terms within a lexicon of sentiment terms associated with the sentiment constitute towards the similarity score for that particular sentiment. Accordingly, for example, all headlines matching, for example, the criteria ⟨(Facebook)OR(LinkedIn)⟩ AND⟨(NewYorkTimes)or (CNN)⟩NOT⟨(Lawsuit)⟩ with positive sentiment form a first headline set whilst those with negative sentiment for a second group. Subsequently, new headlines may be folded to either group or if only positive sentiment was established initially under user direction then negative sentiment matches would be highlighted. Accordingly, headlines matching a criterion and/or criteria may be further categorized according to their sentiment. Optionally, the user may be alerted when the weighting between sentiments moves outside of a predetermined threshold from the initial weighting established with the initial headline set.

In this manner a user may access via a selected headline, a set of documents that are similar to the terms that are associated with the headline. This set of documents can be generated via a method of extracting, ranking and filtering documents from a repository such that the documents are maintained intact, merged to form one master document, processed for salient content extraction and maintained as discrete summaries, or merged to a single extracted salient content file. The method according to embodiments of the invention also supports the extraction of documents from repositories that are different to the one used to generate the headlines, and which contains documents of a different genre, format, or nature for example. For example, the headlines can be generated from traditional news media sites, while the headline-matching documents can be extracted via a query generated (from headline associated keywords) to extract status updates from social media. Further, documents can be presented in the form of a timeline, with optional key events identified within the timeline such as, for example, when a new headline associated with the topic was initially published.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alpha-numeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
    a) receiving a plurality of items of content;
    b) extracting with a microprocessor for each item of content of the plurality of items of content at least one theme of a plurality of themes;
    c) determining an association matrix with the microprocessor for the plurality of themes extracted from the plurality of items of content;
    d) calculating a co-occurrence density with the microprocessor for each theme—theme tuple based upon a co-occurrence count divided by a total number of lines in which the theme occurred and sorting the resulting co-occurrence densities;
    e) selecting a theme—theme tuple and establishing a set of seed terms for the selected theme—theme tuple;
    f) determining with the microprocessor correlations of the set of seed terms with the other themes within the plurality of themes to establish a saliency score for each theme of the plurality of themes; and
    g) filtering the items of content in dependence upon a total saliency score established in dependence upon the established saliency scores of the plurality of themes for each item of content and a predetermined saliency score threshold to create a cohesive cluster of items of content.

2. The method according to claim 1 wherein,
    step (g) further comprises;
        ordering the correlations of the set of seed terms by the saliency score for each theme of the plurality of themes;
        displaying to a user the correlations of the set of seed terms with at least their associated themes of the plurality of themes;
        receiving from the user an indication, the indication establishing the predetermined saliency score threshold.

3. The method according to claim 1 further comprising;
    h) setting with the microprocessor a theme fingerprint in dependence upon at least a predetermined portion of the set of seed terms;
    i) ranking with the microprocessor the items of content within the cohesive cluster based upon their overlap to the theme fingerprint;
    j) setting with the microprocessor the highest rank document as cluster head and the title of highest ranked document as the title of the cluster.

4. The method according to claim 3 further comprising;
    k) displaying the cluster head to the user with its title.

5. The method according to claim 1 further comprising;
    h) adding the seed terms to a list of seed terms not to consider; and
    i) repeating steps (e) through (g) for the remaining items of content to establish a new cohesive cluster.

6. The method according to claim 3 further comprising;
    l) storing the theme fingerprint;
    m) receiving at a subsequent point in time a plurality of additional items of content;
    n) determining whether the plurality of additional items of content belong to the cohesive cluster in dependence upon at least the theme fingerprint.

7. The method according to claim 3 wherein,
    in step (c) determining the association matrix includes inserting a predetermined theme with the plurality of themes extracted from the plurality of items of content, the predetermined theme at least of a pre-existing theme retrieved from a database of themes and a new theme generated by the user.

8. The method according to claim 4 wherein,
    step (k) further includes displaying at least one of a predetermined portion of the documents within the cluster, results of an analysis established in dependence upon at least one of the saliency ordered correlations and the items of contents within the cluster, and results of analytics established in dependence upon at least one of the saliency ordered correlations and the items of content within the cluster.

9. The method according to claim 1 further comprising;
h) determining whether the spread of saliency scores remaining exceeds a predetermined threshold;
i) removing a predetermined portion of the cohesive cluster of items of content to generated a chopped cohesive cluster of items of content;
k) calculating a threshold for the saliencies of the chopped cohesive cluster of items of content;
l) removing those items of content within the chopped cohesive cluster of items of content having saliencies below the threshold mean to generate a highly cohesive cluster of items of content.

10. The method according to claim 9 further comprising;
m) adding the seed terms to a list of seed terms not to consider; and
n) at least one of:
   repeating steps (e) through (g) for the reduced cohesive cluster of items of content to establish a new cohesive cluster; and
   repeating steps (e) through (l) for the reduced cohesive cluster of items of content to establish a new highly cohesive cluster.

11. The method according to claim 1 wherein;
selecting a theme—theme tuple in step (e) comprises selecting the theme-theme tuple with the highest co-occurrence density.

12. The method according to claim 9 wherein,
the threshold is at least one of a statistical mean, a statistical median, a predetermined standard deviation from a statistical mean, a statistically derived threshold, and a predetermined threshold.

* * * * *